US008631091B2

(12) United States Patent
Mislove et al.

(10) Patent No.: US 8,631,091 B2
(45) Date of Patent: Jan. 14, 2014

(54) CONTENT DISTRIBUTION NETWORK USING A WEB BROWSER AND LOCALLY STORED CONTENT TO DIRECTLY EXCHANGE CONTENT BETWEEN USERS

(75) Inventors: Alan Mislove, Boston, MA (US); Ravi Sundaram, Brookline, MA (US)

(73) Assignee: Northeastern University, Boston, MA (US)

( * ) Notice: Subject to any disclaimer, the term of this patent is extended or adjusted under 35 U.S.C. 154(b) by 108 days.

(21) Appl. No.: 13/274,705

(22) Filed: Oct. 17, 2011

(65) Prior Publication Data
US 2012/0096116 A1  Apr. 19, 2012

Related U.S. Application Data

(60) Provisional application No. 61/393,506, filed on Oct. 15, 2010.

(51) Int. Cl.
*G06F 15/16* (2006.01)
(52) U.S. Cl.
USPC ........... 709/217; 709/237; 709/238; 709/239; 709/227; 705/338; 705/331; 705/401

(58) Field of Classification Search
USPC .................................................. 709/217, 238
See application file for complete search history.

(56) References Cited

U.S. PATENT DOCUMENTS

| | | | |
|---|---|---|---|
| 7,617,130 B2 * | 11/2009 | Bezos et al. | 705/27.1 |
| 7,707,293 B2 * | 4/2010 | Zhang | 709/227 |
| 2002/0133570 A1 * | 9/2002 | Michel | 709/219 |
| 2007/0136487 A1 * | 6/2007 | Woo et al. | 709/231 |
| 2007/0204048 A1 * | 8/2007 | Zhang | 709/227 |
| 2007/0233661 A1 * | 10/2007 | Sayuda | 707/3 |
| 2008/0049937 A1 * | 2/2008 | Pauker et al. | 380/270 |

* cited by examiner

*Primary Examiner* — Jude Jean Gilles
(74) *Attorney, Agent, or Firm* — Wilmer Cutler Pickering Hale and Dorr LLP

(57) ABSTRACT

In one embodiment, program code is added to a social network's web pages or site such that the content a first user accesses is locally stored at the first user's system. When another user, who is a friend of the first user, as defined by the social networking site, browses to that same content, the program code fetches it from the first user, instead of directly from the social networking site. The content is thus directly exchanged between the users without a transaction at the website. The present invention leverages the storage and bandwidth resources of social networking users to help serve content.

23 Claims, 7 Drawing Sheets

CONTENT DISTRIBUTION NETWORK USING A WEB BROWSER AND LOCALLY STORED CONTENT TO DIRECTLY EXCHANGE CONTENT BETWEEN USERS

RELATED APPLICATIONS

This application is a non-provisional application claiming priority to U.S. Provisional Patent Application Ser. No. 61/393,506 filed Oct. 15, 2010 and entitled "Automatically Building Content Distribution Networks from Web Site Visitors," the entire contents of which is incorporated by reference herein for all purposes.

BACKGROUND OF THE INVENTION

The past few years have witnessed the beginnings of a shift in the patterns of content creation and exchange over the Internet. Previously, content, in the form of web pages, images, audio and video, was primarily created by a small minority of entities and was delivered to a large audience of web users. However, recent trends such as the rise in popularity of online social networking; the ease of content creation using digital devices like smartphones, cameras, and camcorders; and the ubiquity of Internet access, have democratized content creation. Now, individual Internet users are creating content that makes up a significant fraction of Internet traffic.

This change in the patterns of content creation is leading to a corresponding change in the patterns of content exchange. Users are much more interested in the content created or endorsed by others nearby in their social network, a fact reinforced by the associated privacy settings that allow users to restrict content visibility to their region of the social network. The net result is that, compared to content shared over the Internet just a few years ago, content today is generated by a large number of users located at the edge of the network, is of more uniform popularity and exhibits a popularity distribution that is governed by the users' social networks.

Unfortunately, existing architectures for content distribution, built to serve more traditional workloads, are ill-suited for the new patterns of content creation and exchange. The result is a mismatch between infrastructure and workload. For example, web caches have been shown to exhibit poor performance on social networking content due to the more uniform popularity of content; and many online social networking sites have moved away from content distribution networks (CDNs), and toward highly-engineered in-house delivery solutions, due to the expense and poor content hit ratios.

BRIEF SUMMARY OF THE INVENTION

In one embodiment of the present invention, program code is added to a social network's web pages or site such that the content a first user accesses is locally stored at the first user's system. When another user, who is a friend of the first user, as defined by the social networking site, browses to that same content, the program code fetches it from the first user, instead of directly from the social networking site. The content is thus directly exchanged between the users without a transaction at the website. The present invention leverages the storage and bandwidth resources of social networking users to help serve content.

In one embodiment, a computer-implemented method of distributing content includes receiving a request for content identified on a first website and then determining whether or not the requested content is stored on a local device. If the requested content is stored on a local device, then the requested content is retrieved from the local device and sent in response to the received request.

BRIEF DESCRIPTION OF THE SEVERAL VIEWS OF THE DRAWINGS

Embodiments of the present invention may be better understood by referring to the following description in conjunction with the accompanying drawings in which.

Figure 1:
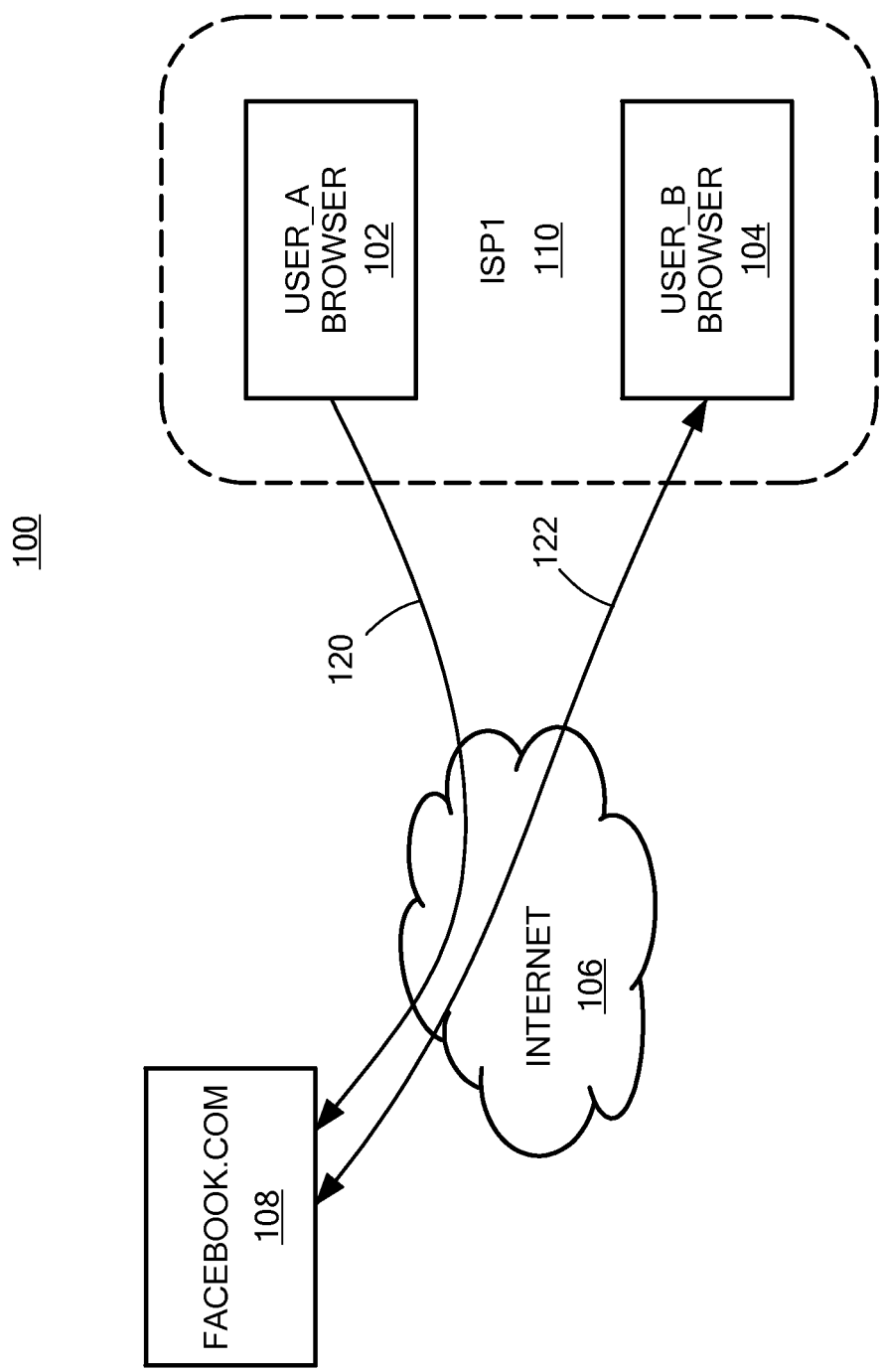
FIG. 1 is a representation of a known approach to content sharing over the Internet.

It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF THE INVENTION

This application is a non-provisional application claiming priority to U.S. Provisional Patent Application Ser. No. 61/393,506 filed Oct. 15, 2010 and entitled "Automatically Building Content Distribution Networks from Web Site Visitors," the entire contents of which is incorporated by reference herein for all purposes.

The emerging content being exchanged over the Internet is being created at the "edge," i.e., by individual entities or users. Recall that just a few years ago, most content was created in the "center" of the network, by a (relatively) small set of users and organizations. Currently, however, the rapid adoption of smartphones, digital cameras, digital camcorders, and professional-quality music and video production software, and the like, combined with the low cost of broadband Internet service, has greatly eased the ability of individual users to create content. Significantly more news articles are written by bloggers than news organizations, more photos are shared on online social networks than on professional photography websites, and much of the content shared on YouTube, the most popular video-sharing site, is generated by end users empowered by the ubiquity of webcams. The net result is that a significant fraction of Internet traffic contains content that is created by individual users at the edge of the network.

Further, the popularity distribution of the content in emerging workloads, relative to previous workloads, is changing. An examination of the popularity of photos on Facebook, as a rough estimate, shows that, compared to prior workloads, the newly emerging workloads have fewer popular items, resulting in a more uniform popularity distribution and a significantly longer, fatter tail.

The manner in which users are locating content is changing. In particular, an analysis undertaken by the inventors shows that the exchange of content is governed by the structure of the social network. Users are significantly more interested in the content that is uploaded by their friends and friends-of-friends. This is similar to the trends in browsing behavior on online social networks where 80% of the photos viewed in Flickr, for example, were found by browsing the social network. It is possible that the impact of the social network is understated as only photos that are publicly viewable were considered. Those photos that are not publicly viewable are very likely to be restricted to only be visible by others close by the uploader's social network, thereby increasing the fraction of local views.

It has also been observed by the present inventors that there is a strong connection between content exchange and geographic locality. The inventors quantified the correlation between social network links and geographic proximity and then compared that to the geographic locality of the content exchange. In one analysis, about 33% of the friends of users from a specific city are also in that city's network. Similar findings have been observed in other regional networks. However, an examination of the fraction of content exchanges that occurs between that city's network users shows that about 51% of the comments (as an identifier of who "receives" the content) are placed by other users within the regional network even though only 33% of the friendship relationships lie completely within the city's network. This indicates that the significant geographic locality already present in social networks is present to an even greater degree in the content exchange that occurs over these networks.

Thus, as outlined above, the content that is increasingly being shared on the Internet today is generated at the edge of the network, but is exchanged using centralized web sites. Referring to FIG. 1, a known system 100 includes a first user 102 and a second user 104 running a browser program on a machine such as a personal computer, smartphone, smartpad, etc., and accessing, through the Internet 106, a destination website 108, for example, facebook.com. The first and second users 102, 104 may obtain access to the Internet 106 through an Internet Service Provider (ISP) 110. In operation, the first user 102 may upload 120 content to the website 108 and the second user 104 may download 122 that content.

Virtually all of the popular online social networks work in this manner, as this model allows users to "pay" for the service by giving the social networking site access to their information for the purposes of advertising. Today, every single piece of data shared on Facebook, i.e., every wall post, photo, status update, friend request, and video, is uploaded to Facebook's data center in California. It is no small irony that one of the world's most centralized architectures is being used to support one of the world's most naturally decentralized workloads. However, as the amount and size of end-user-generated content continues to increase, this centralized approach is likely to become a bottleneck and limit the ability of users to exchange new and larger types of content.

Additionally, the usefulness of existing techniques, such as web caching, is eroding. For example, caching the most popular 10% of the items in traditional workloads would satisfy between 55% and 95% of the requests. Based on the analysis of social network workloads described above, however, such a cache would only satisfy 27% of the requests. This also affects the ability to take advantage of content distribution networks, which similarly work best for popular content.

It may be thought that the most natural approach to address the changing patterns of content exchange is to work toward a more decentralized content exchange approach. The rationale may be that because the underlying problem is that the content is now being exchanged in small groups at the edge of the network allowing these users to exchange content directly would represent a much better match between infrastructure and workload.

Unfortunately, significant technical issues are associated with decentralized content exchange. While a number of distributed content exchange applications exist, the vast majority of social network content exchange still occurs using web sites like Facebook. Thus, in order to serve as a drop-in replacement for current distribution architectures, any new approach would need to work using web technologies. Web sites, however, are designed around a client-server model, and web browsers are not intended to allow direct client-to-client exchanges. Thus, the central technical challenge is in enabling more decentralized content exchange with existing web technologies.

As will be described in more detail below, embodiments of the present inventions provide a content distribution system designed to support the workloads present in existing online social networks. The local storage and bandwidth resources of the users themselves is leveraged to serve content directly to other users. Due to the geographic locality that often exists between friends in online social networks, shared content often stays within the user's local ISP, thereby providing an opportunity for a bandwidth savings for both the site and the ISP. Moreover, the present invention is scalable, as each additional user provides additional resources. As a result, the benefits of large centralized CDNs are provided with much lower costs to the site and the ISP.

In one embodiment of the present invention, as will be described below, a module of Javascript code is added to the online social networking site's web pages. This Javascript intercepts content that a user views and stores it on the user's local machine. Then, when another user views the content, or otherwise attempts to access it, the content is fetched from one of the user's friends, instead of directly from the site. To accomplish this function, a redirector proxy is placed in the ISP, much in the same manner as existing CDN servers. In contrast to such CDN servers, however, the proxy does not actually store any content, but is only present to enable content exchange between online users. Embodiments of the present invention leverage features already present in many web browsers, and therefore do not require any changes to web browsers or any additional client-side software.

One embodiment of the present invention is designed to be deployed by a web site, such as the provider of an online social network. In this specification, the operator of this site will be referred to as the provider. As this embodiment will be operated by a web site provider, it is expected that the clients will access content using web browsers. In particular, one embodiment is designed so that it is compatible with most web browsers. Advantageously, this embodiment of the present invention serves as a cache for content shared between users. Thus, should it not be able to serve a particular request, it is assumed, although not required, that the provider has a copy of the content located on its servers, and can service the request. In addition, as will be described below, content is named by its uploader and content hash, allowing both the proxy and clients to determine which user uploaded it and to easily detect forged content. Thus, embodiments of the present invention serve as a drop-in component that is applicable to many large and popular providers, such as Facebook, MySpace, Flickr and the like.

As is known, the web operates in a client-server manner, a fact that is reinforced by many of the policies that are in place in today's web browsers. For example, the same-origin policy that is applied to Javascript ensures that Javascript code running on a client can only communicate with servers in the same domain. While this is primarily done for security reasons, it has the effect of not only reinforcing the client-server nature of the web (since having Javascript communicate with another client is clearly not allowed), but also of restricting the Javascript code to communicating with only a very small set of servers. Advantageously, because direct communication between web browsers is otherwise not possible, embodiments of the present invention approximate direct communication using today's web browsers.

This approximation is accomplished by keeping the content exchange completely within a single ISP's network. This addresses the geographic or local aspects of sharing described above. As a non-limiting example, suppose that two users who are exchanging content are served by the same ISP. In this case, keeping the content exchange within the ISP, even if not directly between the users, is sufficient to reduce both the provider's and the ISP's costs. For the provider, keeping the content exchange within the ISP obviates the need for the provider to serve the content and reduces the cost of bandwidth and serving infrastructure. For the ISP, keeping the content within its network removes the bandwidth cost of downloading the content from another ISP. Thus, both the provider and the ISP are incentivized to keep the content exchange within the ISP.

Figure 2:
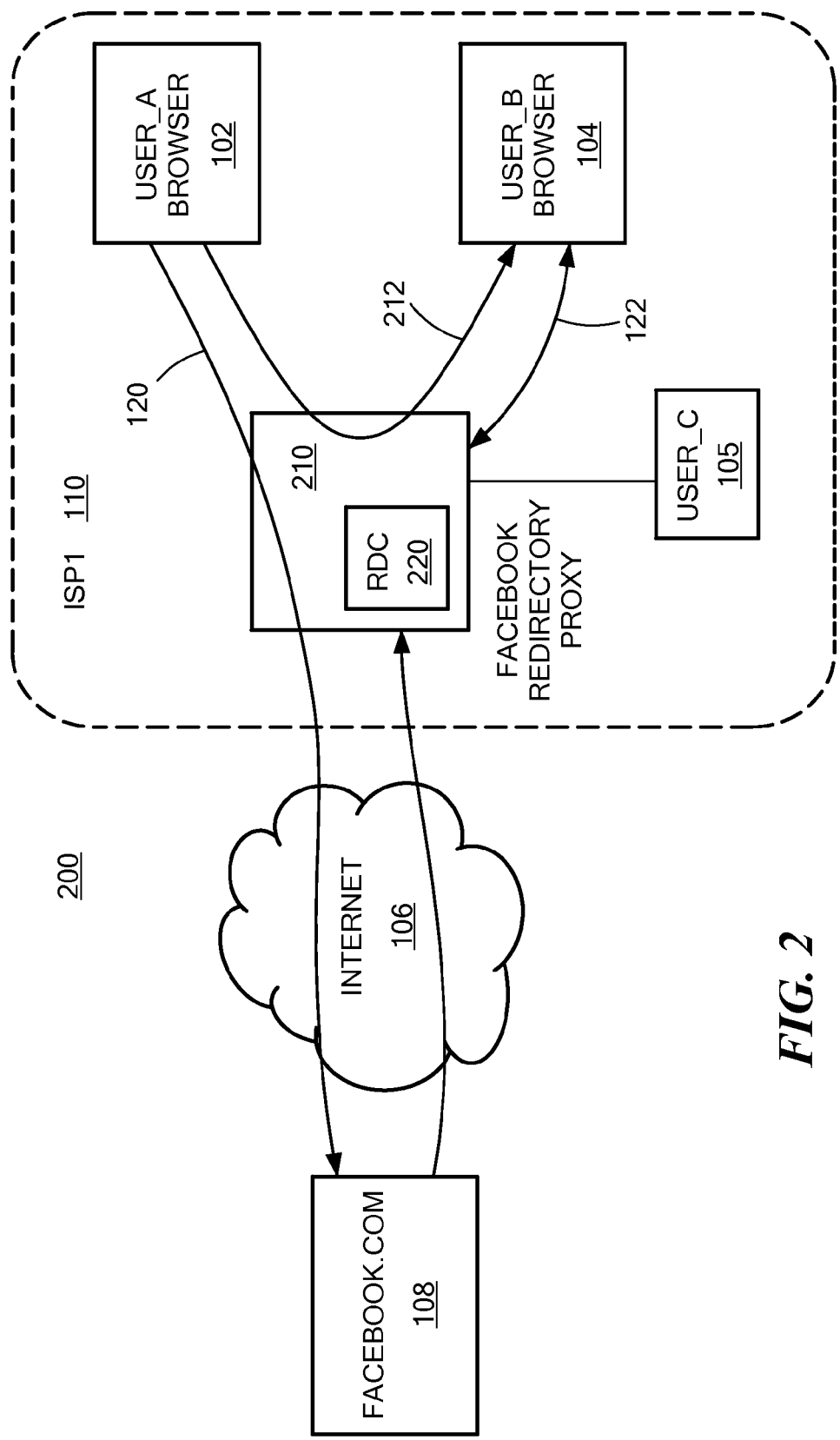
FIG. 2 is representation of a system for sharing content in accordance with one embodiment of the present invention.

At a high level, an embodiment of the present invention emulates direct client-to-client communication between web browsers by introducing middleboxes called redirector proxies. Referring now to FIG. 2, a system 200 in accordance with an embodiment of the present invention includes a redirector proxy 210. These proxies 210, located within each geographic region of ISPs 110, serve as a relay between web clients 102, 104, enabling communication and the transfer of content. Thus, for example, instead of the second user 104 accessing 122 content directly from the provider 108, the request 122 is processed by the redirector proxy 210. As will be described below, if the proxy determines that the requested content is locally stored on the first client 102, the content will be retrieved from the first client 102 and sent 212 to the second client 104. The proxy 210 determines if any other online local user 102, 104 has the content, and if so, fetches the content from that user and transmits it to the requestor. Should no local client have the content, the proxy 210 requests it directly from the provider 108 as known or passes the request along to the provider.

In order to enable the present invention on the client side, a module of Javascript redirector code (RDC) 220 is added to the provider's 108 web pages. The Javascript code 220 serves two functions: communicating with the redirector proxy 210, and storing and serving local content.

The code can be added at either of two places: a) at the content provider; or b) at the ISP. When added at the content provider, the code can be implemented statically by a script that adds the code to all of the pages on the web site. Alternately, the code can be added by a server-side plug-in located in the provider's website that adds the code to the pages as they are dynamically (created and) served up to the user.

If added at the ISP, either a router-side plug-in or a modification to a Layer-4 box can be used to add the code to pages fetched by the ISP's users of the particular website.

To communicate with the proxy 210, the Javascript RDC 220 opens and maintains an active connection to the local redirector proxy 210. This connection can use one of two technologies: XMLHTTPRequests (XHRs) using long polling, or WebSockets, a newly developed standard that is seeing acceptance in major browsers. As of this writing, it is available in the newest versions of the Safari, Firefox, and Chrome browsers. Using XHRs, the client 102, 104 always maintains an outstanding, unanswered XHR to the proxy 210 (should this request time out, another is simply created). This allows the proxy 210 to send messages to the client 102, 104 (by finally responding to this request with the content of the message), and allows the client 102, 104 to send messages to the proxy 210 (by creating a new XHR with the message). Using WebSockets, the client creates and maintains a single bi-directional communication channel to the proxy.

To store and serve local content, the Javascript uses the LocalStorage API that is supported in most web browsers. In brief, LocalStorage allows a web site to store persistent data on the disk of the web client. LocalStorage is similar to cookie storage in that it presents a key/value interface and is persistent across sessions but is larger in size and can be programmatically accessed via Javascript more easily. When a user views content in accordance with the present invention, the Javascript stores this content in the user's LocalStorage, treating it as a least-recently-used cache. Thus, each user's LocalStorage contains the content most recently viewed by that user.

In order to implement the present invention, the provider loads browsed content by changing the URL of the content objects to be a Javascript call into a library associated with the invention implementation.

A redirector proxy 210 allows clients 102, 104 to fetch content from each other. Each redirector proxy 210 maintains connections to all of the provider's 108 online clients 102, 104 that are located within the same geographic region and the same ISP 110 as the proxy 210. For example, a Facebook redirector proxy placed in ISP Foo.net in Boston would maintain connections with all Facebook users who are online and logged in from Foo.net's Boston network.

Figure 3:
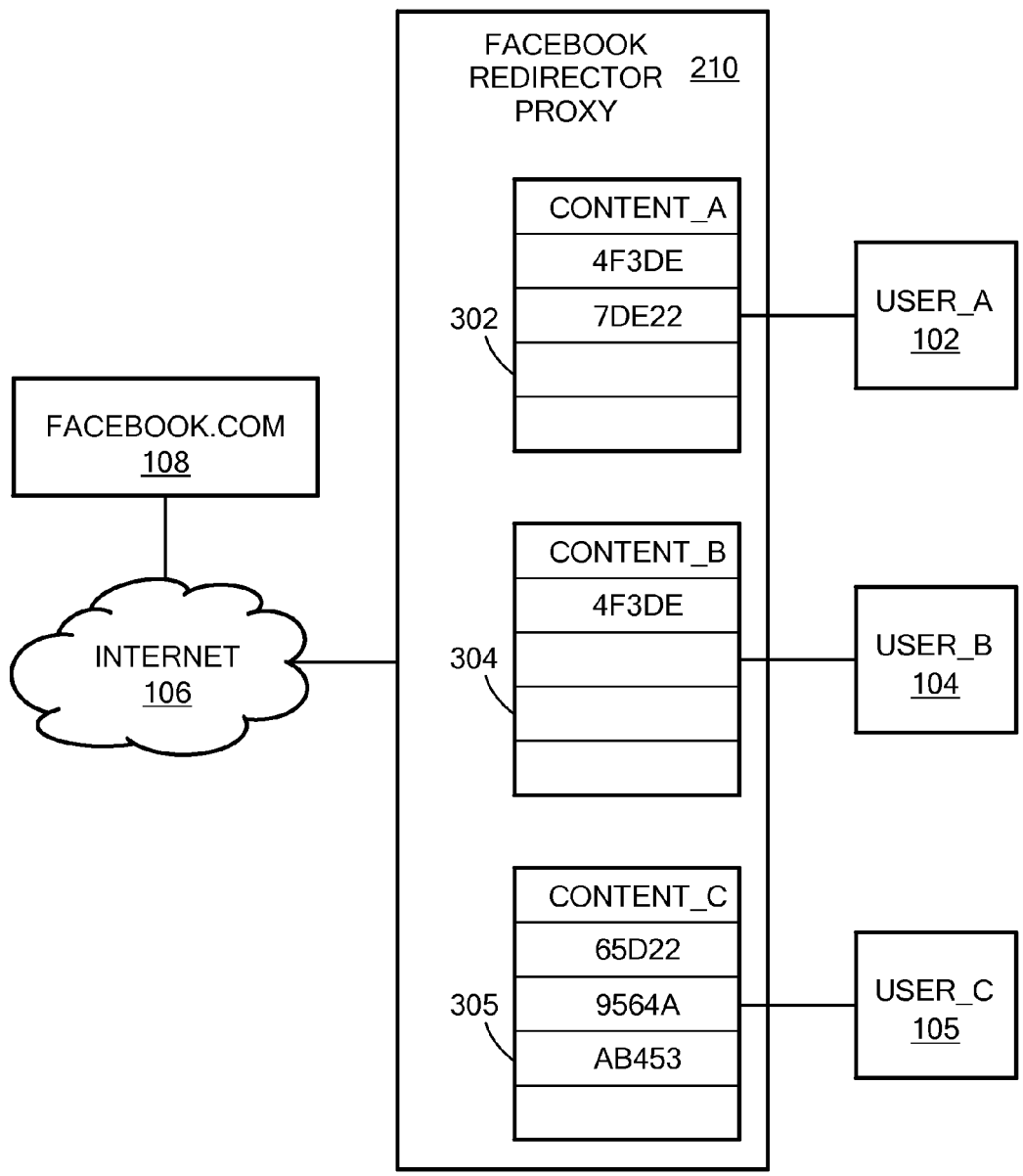
FIG. 3 is a block diagram of tracking locally stored content in accordance with an embodiment of the present invention.

The proxy 210 also keeps a list of the content that each user stores in their LocalStorage, enabling it to serve requests for content. A diagram of the state maintained by each proxy is shown in FIG. 3. Thus, tables 302, 304, 305 list the locally stored content for the first, second and third users 102, 104, 105, respectively. For example, referring to FIG. 3, if the first user 102 requested content AB453, the proxy 210 would fetch the content from the third user 105 and then deliver it to the first user 102. Should the proxy 210 be unable to service a request using the local clients (for example, if none of the connected users were storing the requested piece of content), the proxy 210 fetches the content from the provider's servers 108 in the same manner as individual clients do today. Thus, the performance of the present invention (measured by the fraction of requests served by a connected client) is dependent on the browsing patterns of users and their online/offline behavior.

It should be noted that while separate tables 302, 304, 305 have been depicted for maintaining the information as to locally stored content there are certainly other data structures that could be implemented to accomplish this function. One of ordinary skill in the art will understand that a single table could be maintained or the information arranged in a different manner but which would accomplish the same result. The separate tables depicted in FIG. 3 are for explanatory purposes only and not intended to limit the invention.

The domain name of the redirector proxy 210 is chosen so that it is a member of the provider's domain 108. For example, a redirector proxy for Facebook would have a domain name in the facebook.com domain. Doing so enables the Javascript running on the client 102, 104, 105 to be able to communicate with the proxy 210. Were the proxy 210 given a name outside of the provider's domain 108, the Javascript same-origin policy would prohibit communication.

The communication protocol between the Javascript on the client 102, 104, 105 and the redirector proxy 210 is shown in Table 1 where (C) is the client and (P) is the proxy.

TABLE 1

| Action | Direction | Arguments |
|---|---|---|
| connect | C → P | user ID, session key |
| update | C → P | content IDs stored |
| fetch | C ↔ P | content ID |
| response | C ↔ P | content ID, content |
| close | C → P | |

The protocol consists of five message types, described hereafter:

connect: The client sends a connect message to the proxy when it is first connected. The message contains the user's ID, as well as a session key given by the provider, allowing the proxy to verify that the user is who he claims to be.

update: The client sends an update message to the proxy to inform the proxy of the set of locally stored content. The message contains the list of content that the client has in its LocalStorage, and the proxy records this list. The client can later send further update messages to the proxy, should the contents of its LocalStorage change, e.g., content is added or removed.

fetch: The fetch message can be sent either from the client to the proxy or vice versa, and contains the identifier of the content requested. When the client sends the fetch message to the proxy, the proxy checks to see if any other client has reported having that content in its LocalStorage. If so, the proxy forwards the fetch message to that client. If not, the proxy fetches the content from the provider as is done today.

response: The response message is a reply to the fetch message, and contains the content identifier (the content hash) and the content itself. This message can be sent either from the proxy to a client (who originally requested the content), or from a client to the proxy (in response to a forwarded fetch message), i.e., the messages fetch and response are symmetric.

close: Finally, the client can send a close message when the user navigates away from the provider's site. This message is optional (the proxy can also detect this event when the connection itself is closed), and therefore is only an optimization.

A typical session would consist of a client connecting to the proxy with a connect, and sending an update message to inform the proxy of the content that is locally stored. The client and proxy then exchange fetch, response, and update messages, as both the local user and other remote users browse content, and the client finally leaves by sending a close message.

Connecting Multiple Proxies

Figure 4:
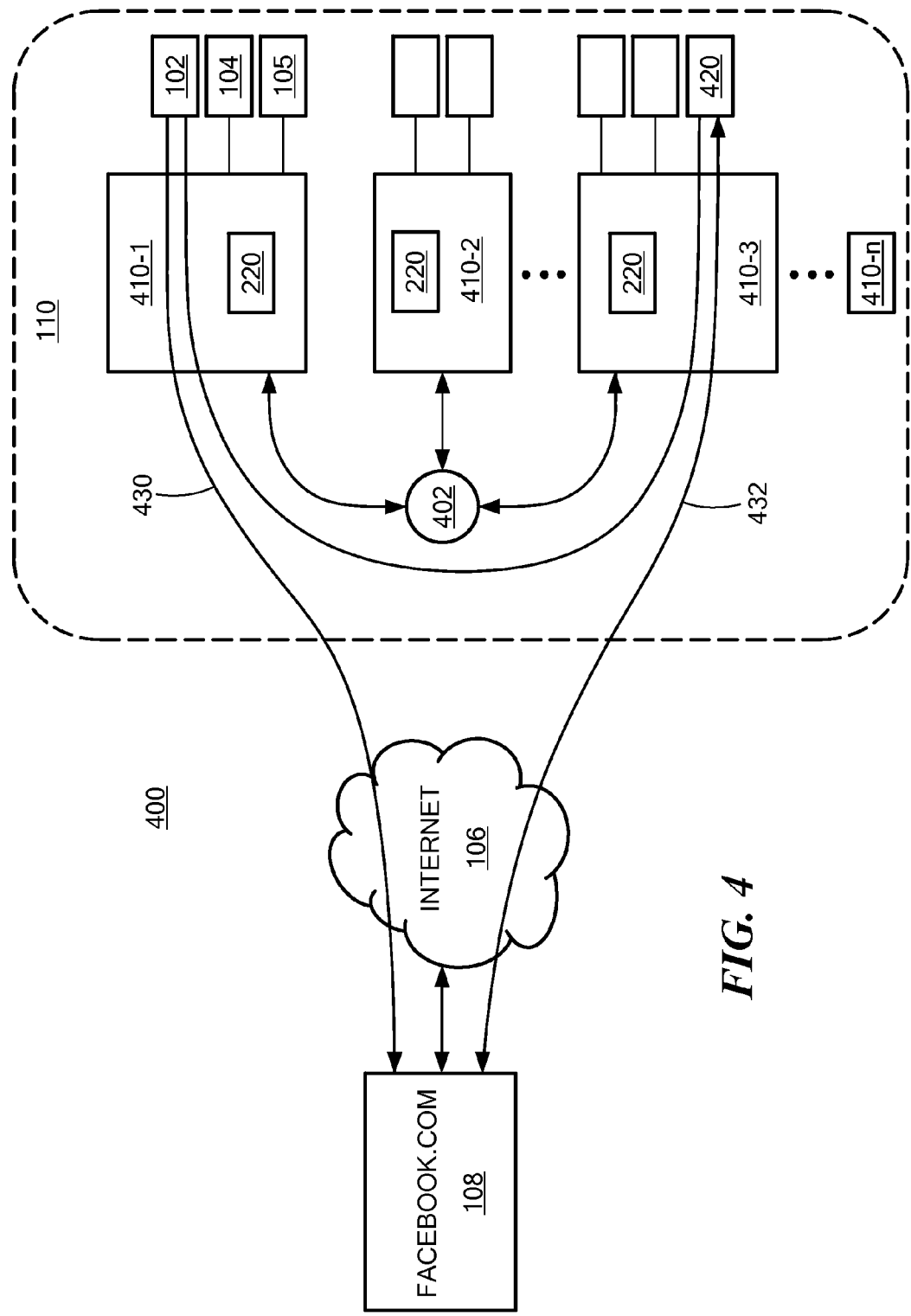
FIG. 4 is a network diagram of an embodiment of the present invention implementing multiple redirector proxies.

The foregoing embodiment is directed to the case of a single redirector proxy 210. Should the invention be deployed in a large city, for example, multiple redirector proxies may be used to support a larger number of clients. Referring now to FIG. 4, a system 400 includes multiple proxies 410-1, 410-2, ...410-n, coupled to users 102, 104, 105, etc., and to the RDC 220. Clearly, it would be beneficial for these proxies to communicate and allow the exchange of content between clients connected to different proxies 410-n. Otherwise, each proxy 410-n would only be able to allow its locally connected clients to fetch content from each other, even though clients connected to other proxies 410-n may have content that local clients request. To enable multi-proxy communication, existing server scaling and data center techniques may be leveraged as described below.

When moving from a single proxy 210 to multiple proxies 410-n, one function that needs to be coordinated is locating a client 102, 104, etc., who is storing a particular piece of content (since all clients are no longer connected to a single proxy 210, each proxy 410-n is no longer aware of all the content that is available). To coordinate this process, two steps are implemented. First, the proxies 410-n are divided up into different regions depending on the ISP 110 and provider policies, roughly corresponding with geography. For example, all of the proxies 410-n in New England might be placed into a single region. Second, the proxies 410-n in each region run a distributed hash table (DHT) protocol, such as Chord or Pastry. Such DHT protocols are highly scalable and their overhead is relatively low when the set of nodes in the network is fairly stable (as is the case with the set of redirector proxies).

In order to efficiently locate content, the proxies use the DHT protocol to support a publish/subscribe system, such as Scribe. In particular, a multicast group 402 is created for each user. Proxies 410-n subscribe to a user's multicast group when one of the locally connected clients is storing content that was uploaded by that user. For example, if a proxy's clients were locally storing content uploaded by the users 102, 104 and 105, the proxy 410-1 would be subscribed to the multicast groups for the users 102, 104 and 105. Then, when a proxy 410-n receives a request for content that is not stored locally by any of its clients, it anycasts into the multicast group 402 of the content's uploader, with an anycast predicate containing the identifier of the desired content. A proxy 410-n receiving the anycast and that has a locally connected client with that content will then accept the anycast, fetch the data from the client as normal, and respond to the requesting proxy. For example, the first user 102 has uploaded 430 content that the user 420 then requests 432. The proxy 410-3 determines that it has no record of it stored locally on any of its currently connected users and will send any anycast request. The proxy 410-1 will receive the request, see that the requested content is from the user 102 and also determine that the content is locally available. The requested content will be sent from the proxy 410-1 to the proxy 410-3 and to the requesting user 420 all without having to retrieve from the provider 108 and without going out from the ISP 110. This architecture enables the scalable location of content among multiple proxies in a region. Moreover, scalable anycast techniques have been built to allow the efficient processing of anycasts among many multicast groups.

Figure 5A:
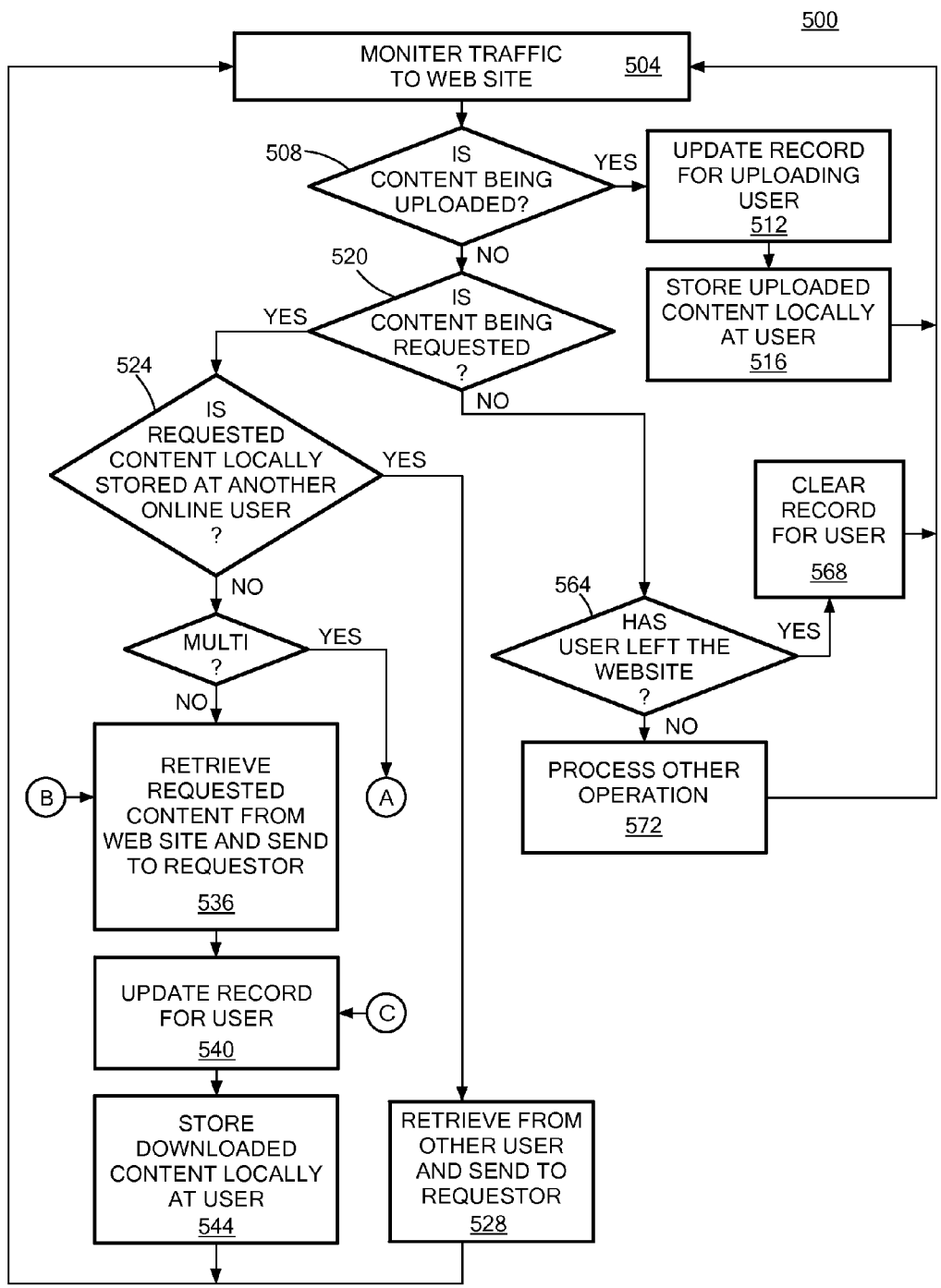
FIGS. 5A and 5B show a flowchart for a method in accordance with an embodiment of the present invention.
Figure 5B:
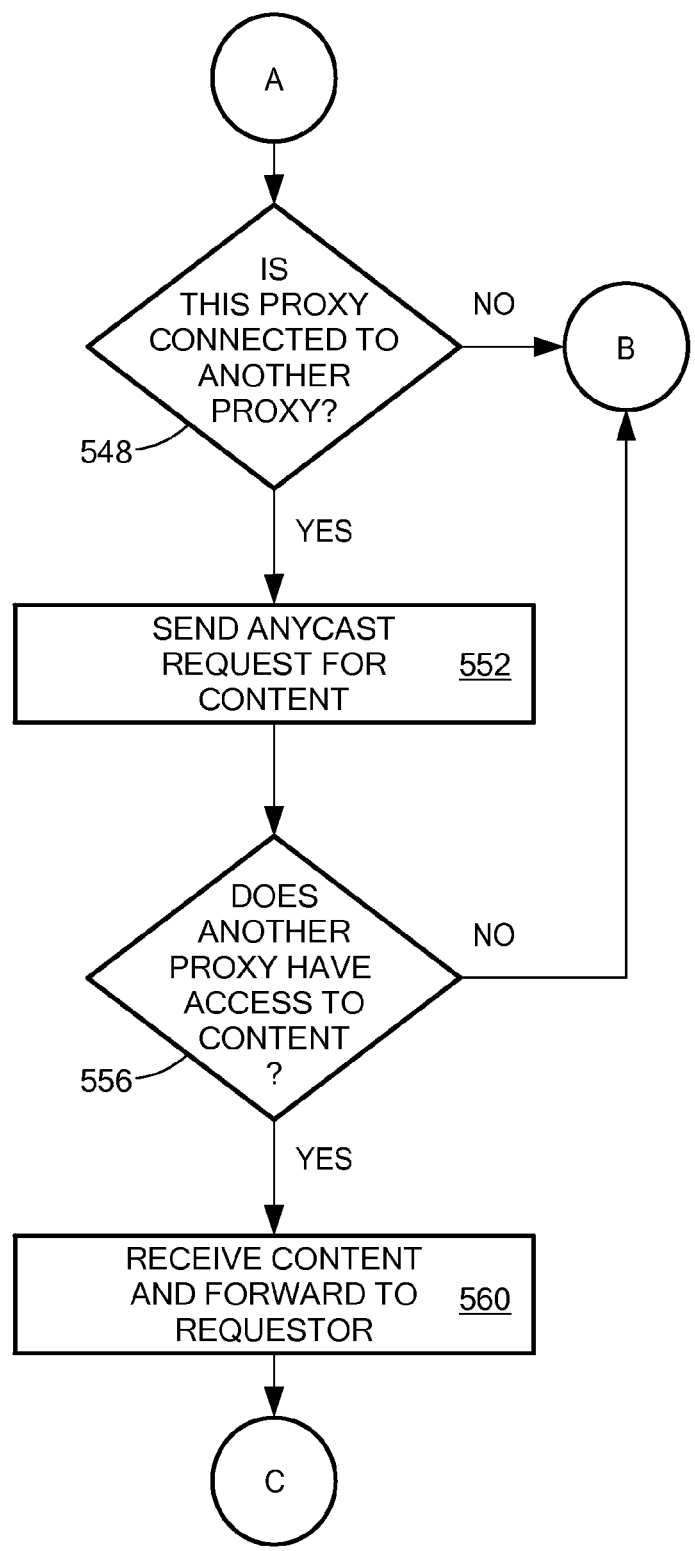

Referring now to FIGS. 5A and 5B, a method 500 of an embodiment of the present invention is shown. Initially, step 504, the traffic between the online users 102, 104, etc. and the provider 108 is monitored by the proxy 210, 410-n. At step 508 it is determined if content is being uploaded, if so, then control passes to step 512 where the proxy updates its records as to which user uploaded the content and the content identifying information. The content is then stored locally at the uploading user, step 516.

Returning to step 508, if content is not being uploaded then control passes to step 520 where it is determined whether or not content is being requested. If this is a request, control passes to step 524 where the proxy determines whether or not the requested content is available from another local online user. If so, then control passes to step 528 and the requested content is retrieved from the local storage of the other user and sent to the requestor.

If the proxy does not have record of the requested content being locally available then, step 532, is it determined if this is a multi-proxy system. If not, control passes to step 536 and the requested content is retrieved from the provider website and sent to the requestor. Subsequently, step 540, the proxy updates the record for the requesting user to show that the user has the content and then, step 544, the content is locally stored at the requesting user. Of course, one of ordinary skill in the art will understand that steps 540 and 544 could be reversed.

Returning now to step 532, if the requested content is not locally available to the proxy and it is a multi-proxy system, control passes to step 548 where it is determined if there are other proxies to communicate with. If not, control passes back to step 536 as described above. If so, control passes to step 552 and an anycast message is sent requesting the content. If another proxy replies that it has the content, step 556, control passes to step 560 and the content is retrieved and sent to the requesting user. Otherwise, control passes to step 536 as described above.

Returning now to step 520, if content is not being requested then control passes to step 564 to determine if an indication that a user has disconnected, i.e., navigated away, from the provider has been received. If a user has disconnected, then control passes to step 568 and the proxy clears its record for that user, step 568. Otherwise, control passes to step 572 for other processing as appropriate.

Embodiments of the present invention that use LocalStorage for content provide an advantage over simply caching content at the proxy. It may appear that it would be simpler to simply cache content at the proxy instead of in the users' LocalStorage. Such a design might appear to be simpler, and would approximate the design of the centralized CDNs of today, however, such a design has two downsides. First, caching in the network is much less effective for the emerging workloads as described above. Thus, such a cache would be less effective than centralized CDN caches. Second, as users begin to share larger pieces of content, e.g., videos, such a cache would require significantly more storage and would quickly increase in cost. Using the present invention, providers can push that storage cost onto the users themselves (who, in aggregate, have significantly more storage resources than any one proxy), resulting in a more scalable system with lower costs.

Further, the present invention takes advantage of the extended time periods that users stay on social networks. Should the average session time be short, it may appear unlikely that the invention would be able to serve many content requests as a large number of users may not be online at the same time. However, many social networks exhibit long session times, e.g., Facebook has been observed to have average session times of almost 30 minutes. Additionally, these sites often provide incentives for users to stay "online," such as the presence of instant-messaging or chat facilities. The result is that in the sites where the present invention may be implemented and most effective, it is likely that users will have significant session times.

Embodiments of the present invention can handle malicious users. There are two primary concerns: first, malicious users might attempt to serve bogus content to other users, and, second, malicious users might attempt to perform a denial-of-service attack by overloading the proxy or violating the protocol. For the first concern, all content is named by its content-hash, so the proxy or other users are able to immediately detect and purge forged content. For the second concern, users who violate the protocol, e.g., by claiming to have content stored locally that they later turn out to not have, can largely be addressed in a similar manner to how they are addressed today. Providers such as Facebook often block accounts, IP address, or subnets where malicious behavior is observed.

The present invention provides an acceptable level of privacy for sharing content. First, the present invention only allows users to fetch content that they could access anyway (all content requests are still subject to authentication), so users cannot abuse the present invention in order to view content they otherwise could not. Second, users do receive some information about views of content by other users. However, due to the indirect nature of the communication, the present invention effectively provides k-anonymity to browsing users, where k is the number of online users connected to the same proxy who are able to view the photo. Moreover, many providers already provide some form of view information to users, e.g., view counts, or names left beside comments on content, so this additional information is unlikely to leak any information that was not already available.

Regardless, there may be corner cases where anonymity is insufficient, e.g., if a user only makes a piece of content visible to a single other user, effectively removing viewer anonymity. In such cases, the provider can disable loading such content via the present invention (or can allow the browsing user to do so). Alternatively, the provider can configure the proxies to add background requests to random pieces of content, sometimes referred to as cover traffic, in order to obfuscate requests.

The deployment of redirector proxies in each ISP may be variable. Clearly, a large provider like Facebook could deploy its own proxies if it chooses, but this option is only practical for the largest providers. However, the proxies could also be provided as a service by existing CDNs like Akamai and Limelight. These CDNs already have servers in place in many ISPs, and these servers could be used to support embodiments of the present invention especially since no additional storage is required.

As described above, only content that users browse to is stored. However, the present invention includes an architecture that allows the provider to push content to the clients' LocalStorage, effectively populating the LocalStorage of the user before the user has browsed to such content. Such an approach could be used to implement a number of techniques. First, the provider could pre-fetch content that the user is likely to view, e.g., photos in which the user was "tagged," thereby reducing the latency for the user. Second, the provider could use this technique to replicate content (ensuring that a sufficient number of users are storing each piece of content), thereby increasing the hit rate and further reducing the load on the provider's servers.

An implementation of the present invention was designed to work with Facebook's photo-sharing feature. Photos are one of the most popular content-exchange mechanisms on Facebook, and Facebook stores over 50 billion photos. The redirector proxy consists of 1,283 lines of Python, most of which is the low-level communication support code for WebSockets and XHRs. The client-side support consists of 1,226 lines of Javascript.

In order to make installation as easy as possible, the code was configured to be installed by being injected into Facebook's Javascript code. To do so, users who installed the present invention did so by configuring their browser to use automatic web proxy configuration script (commonly called a proxy.pac file). The web proxy would modify Facebook's Javascript in-transit in order to add the code. Additionally, the web proxy would serve all content requests for Facebook photos, thereby allowing it to naturally work with Facebook's techniques like photo pre-fetching. One of ordinary skill in the art will understand that there are other mechanisms or approaches for accomplishing the same functions as described herein.

The foregoing description was exemplary and the invention is not intended to be limited to operating only in conjunction with social-networking sites nor for only sharing photos. The present invention can be used to facilitate the content sharing load for any type of content and for any web site irrespective of whether or not it is characterized as a "social" network. Further, a redirector proxy may be responsible for more than one website, especially where there might be synergies involved in that content on one site is often identified from another, e.g., images on Flickr identified on Facebook. The proxy may keep track of content from both websites in order to service content requests.

Figure 6:
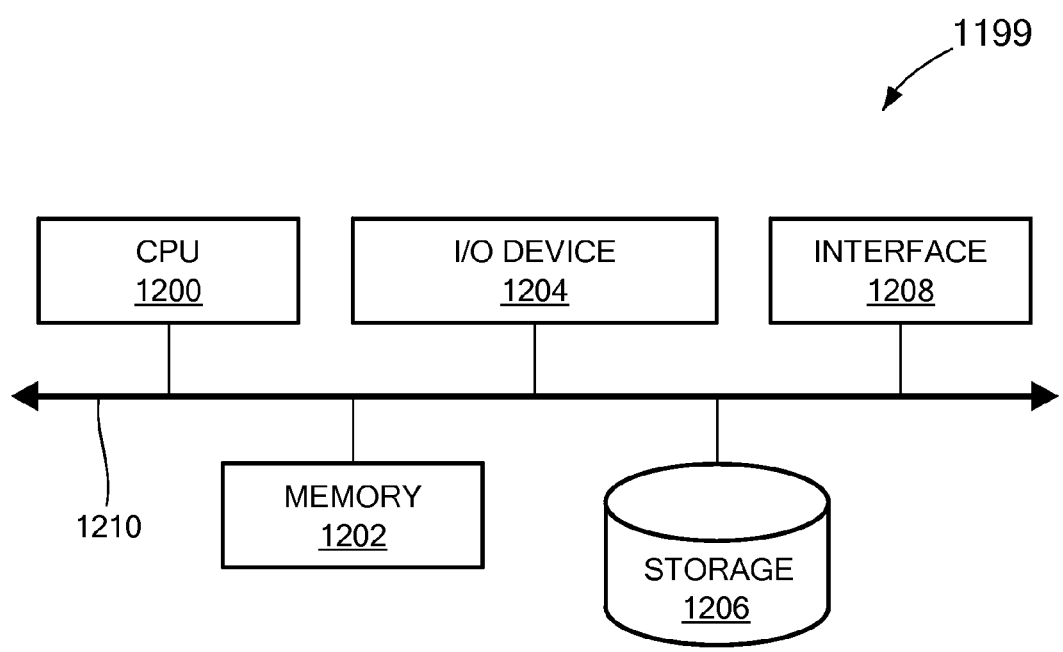
FIG. 6 is a device on which embodiments of the present invention may be implemented.

The redirector proxies, as well as the browsers described above can be implemented on a number of difference hardware platforms. In general, the embodiments of the present invention run on a general purpose computer under control of a computer program. The computer, as above, can be any one of a number of different devices, however, these devices have some components and/or functionality in common irrespective of their relative technical complexities. As shown in FIG. 6, a computing device 1199 includes a central processing unit 1200, a memory 1202, an input/output device 1204, for example a keyboard, keypad or touch screen, a storage device 1206, for example a hard disk drive, and an interface 1208 for communicating to a network. A bus 1210 couples these devices to one another to allow communication between them.

The computer may run an operating system such as Microsoft Windows, UNIX, Linux or Apple OS. The applications programs may be a program or combination of programs written in any one of a number of available programming languages including, but not limited to, C, C++, JAVA, Javascript, Perl and FORTRAN.

Embodiments of the above-described invention may be implemented in all software, all hardware, or a combination of hardware and software, including program code stored in a firmware format to support dedicated hardware. A software implementation of the above described embodiment(s) may comprise a series of computer instructions either fixed on a tangible medium, such as a computer readable media, e.g. diskette, CD-ROM, ROM, or fixed disk or transmittable to a computer system in a carrier wave, via a modem or other interface device. The medium can be either a tangible medium, including but not limited to optical or analog communications lines, or may be implemented with wireless techniques, including but not limited to radio, microwave, infrared or other transmission techniques. The series of computer instructions whether contained in a tangible medium or a carrier wave embodies all or part of the functionality previously described herein with respect to the invention. Those skilled in the art will appreciate that such computer instructions can be written in a number of programming languages for use with many computer architectures or operating systems and may exist in machine executable format. It is contemplated that such a computer program product may be distributed as a removable media with accompanying printed or electronic documentation, e.g., shrink wrapped software, preloaded with a computer system, e.g., on system ROM or fixed disk, or distributed from a server over a network, e.g., the Internet or World Wide Web.

Although various exemplary embodiments of the present invention have been disclosed, it will be apparent to those skilled in the art that changes and modifications can be made which will achieve some of the advantages of the invention without departing from the general concepts of the invention. It will be apparent to those reasonably skilled in the art that other components performing the same functions may be suitably substituted. Further, the methods of the invention may be achieved in either all software implementations, using the appropriate processor instructions, or in hybrid implementations that utilize a combination of hardware logic and software logic to achieve the same results. It is, therefore, to be understood that the appended claims are intended to cover all such modifications and changes as fall within the true spirit of the present invention.

What is claimed is:

1. A computer-implemented method of distributing content, the method comprising:
connecting, using a first proxy, a plurality of first devices to content on a website, wherein at least one of the content is provided to the website, and wherein at least one of the plurality of first devices is configured to store the at least one of the content;
storing, on a memory associated with the first proxy, a stored content record for the at least one of the content on the at least one of the plurality of first devices;
receiving, at the proxy from a device of the plurality of first devices, a request for first content identified on the website;
determining, using the stored content record, whether the requested first content is stored on at least one of the plurality, of first devices; and
sending the first content from the at least one of the plurality of first devices to th device requesting the first content in response to the received request, if the first content is stored on the at least one of the plurality of devices.

2. The computer-implemented method of claim 1, further comprising:
sending the first content sourced from the website to the device requesting the first content if it is determined that the first content is not stored on the at least one of the plurality of devices.

3. The computer-implemented method of claim 1, wherein the stored content record comprises a hash value based on data in the at least one of the content.

4. The computer-implemented method of claim 1, wherein the stored content record further comprises an identification of the at least one of the plurality of first devices providing the at least one of the content.

5. An information processing system performing a content distribution process, the system comprising:
a first proxy connected to a plurality of first devices, wherein the first proxy connects the plurality of first devices to content on a website, wherein at least one of the content is provided to the website, and wherein at least one of the plurality of first devices is configured to store the at least one of the content; and
a memory associated with the first proxy that stores a stored content record for the at least one of the content on the at least one of the plurality of first devices;
wherein the first proxy is configured to:
receive, from a device of the plurality of first devices, a request for first content on the first website;
determine, using the stored content record, whether the requested first content is stored on the at least one of the plurality of first devices; and send the first content from the at least one of the plurality of first devices to the device that requested the first content in response to the received request, if the first content is stored on the at least one of the plurality of first devices.

6. The system of claim 5, wherein the first proxy is further configured to update the stored content record to indicate that the first content is stored on the device that requested the first content.

7. The system of claim 5, wherein the at least one of the content provided to the website is provided by at least one of the plurality of first devices.

8. The system of claim 5, wherein the first proxy is further configured to:
receive second content to be provided to the website from a device of the plurality of first devices; and
update the stored content record to indicate that the second content is stored on the device that provided the second content.

9. The system of claim 5, wherein:
the first proxy is connected to a second proxy that is connected to a plurality of second devices, the second proxy that stores, on a memory, a second stored content record for at least one of the content on the website stored on at least one of the plurality of second devices; and
the first proxy is further configured to request the first content from the second proxy if the first content is not stored on the at least one of the plurality of first devices.

10. The system of claim 5, wherein the configuration to send the first content from the at least one of the plurality of first devices to the device that requested the first content comprises configurations to retrieve the first content from the at least one of the plurality of first devices and to send the retrieved first content to the first device.

11. The system of claim 5, wherein the first proxy is further configured to send the first content from the website to the device that requested the first content in response to the received request, if it is determined that the first content is not stored on the at least one of the plurality of first devices.

12. The system of claim 5, wherein the stored content record comprises a hash value based on data in the at least one of the content.

13. The system of claim 5, wherein the stored content record further comprises an identification of the at least one of the plurality of first devices providing the at least one of the content.

14. The computer-implemented method of claim 1, further comprising updating the stored content record to indicate that the first content is stored on the device requesting the first content.

15. The computer-implemented method of claim 1, wherein the at least one of the content provided to the website is provided by at least one of the plurality of first devices.

16. The computer-implemented method of claim 1, further comprising:
receiving second content to be provided to the website from a device of the plurality of first devices; and
updating the stored content record to indicate that the second content is stored on the device providing the second content.

17. The computer-implemented method of claim 1, further comprising requesting the first content from a second proxy if the first content is not stored on the at least one of the plurality of first devices, wherein the second proxy is connected to a plurality of second devices, the second proxy storing, on a memory, a second stored content record for at least one of the content on the website stored on at least one of the plurality of second devices.

18. The computer-implemented method of claim 1, wherein sending the first content from the at least one of the plurality of first devices to the device requesting the first content comprises retrieving the first content from the at least one of the plurality of first devices and sending the retrieved first content to the first device.

19. A computer program product, residing on one or more non-transitory machine readable storage media encoded with instructions, that when executed by one or more processors, cause the one or more processors to:
connect, using a first proxy, a plurality of first devices to content on a website, wherein at least one of the content is provided to the website and wherein at least one of the plurality of first devices is configured to store the at least one of the content;
store, on a memory associated with the first proxy, a stored content record for the at least one of the content on the at least one of the plurality of first devices;
receive, on the proxy from a device of the plurality of first devices, a request for first content identified on the website;
determine, using the stored content record, whether the requested first content is stored on at least one of the plurality of first devices; and
send the first content from the at least one of the plurality of first devices to the device that requested the first content in response to the received request, if the first content is stored on the at least one of the plurality of devices.

20. The computer program product of claim 19, that when executed by one or more processors, further causes the one or more processors to send the first content from the website to the device that requested the first content if it is determined that the first content is not stored on the at least one of the plurality of devices.

21. The computer program product of claim 19, that when executed by one or more processors, further causes the one or more processors to:
receive second content to be provided to the website from a device of the plurality of first devices; and
update the stored content record to indicate that the second content is stored on the device providing the second content.

22. The computer program product of claim 19, that when executed by one or more processors, further causes the one or more processors to request the first content from a second proxy if the first content is not stored on the at least one of the plurality of first devices, wherein the second proxy is connected to a plurality of second devices, the second proxy storing, on a memory, a second stored content record for at least one of the content on the website stored on at least one of the plurality of second devices.

23. The computer program product of claim 19, that when executed by the one or more processors to send the first content from the at least one of the plurality of first devices to the device requesting the first content further comprises the one or more processors to use the first proxy to retrieve the first content from the at least one of the plurality of first devices and to use the first proxy to send the retrieved first content to the first device.

* * * * *